United States Patent
Blake et al.

[11] 3,927,659
[45] Dec. 23, 1975

[54] PEAK EFFICIENCY SOLAR ENERGY POWERED BOILER AND SUPERHEATER

[75] Inventors: Floyd A. Blake, Littleton; Murlin T. Howerton, Denver, both of Colo.

[73] Assignee: Martin Marietta Corporation, New York, N.Y.

[22] Filed: Sept. 21, 1973

[21] Appl. No.: 399,670

[52] U.S. Cl. .................................. 126/271; 60/641
[51] Int. Cl. .............................................. F24j 3/02
[58] Field of Search ................ 126/270, 271; 60/26

[56] References Cited
UNITED STATES PATENTS

| | | | |
|---|---|---|---|
| 811,274 | 1/1906 | Carter | 126/271 |
| 1,696,003 | 12/1928 | Harvey | 126/271 |
| 1,951,403 | 3/1934 | Goddard | 60/26 X |
| 1,969,839 | 8/1934 | Goddard | 126/271 |
| 1,993,213 | 3/1935 | Gill | 126/271 |

*Primary Examiner*—William F. O'Dea
*Assistant Examiner*—Peter D. Ferguson
*Attorney, Agent, or Firm*—Sughrue, Rothwell, Mion, Zinn & Macpeak

[57] ABSTRACT

A cup-shaped enclosure forms an energy conversion chamber open at one end to a solar energy radiation field which is generally in axial alignment therewith, the conversion field incorporating, in order, from the thermal energy receiver aperture at the open end, a boiler heat exchanger and a superheater heat exchanger, which line the radial wall and the closed end wall of the chamber respectively. A water cooled window at the aperture closes off the aperture end of the conversion chamber and is opaque to infra-red radiation, prevents escape of thermal energy by convection. A frustoconical reflecting surface extends radially outward of the enclosure and away from the window to reflect fringe solar radiation into the chamber. One or more cylindrical superheater heat exchanger coils may protrude axially towards the window from the rear end of the chamber. The frustoconical reflecting surface and the window are cooled by further heat exchangers which preheat the feed water entering the boiler heat exchanger.

7 Claims, 1 Drawing Figure

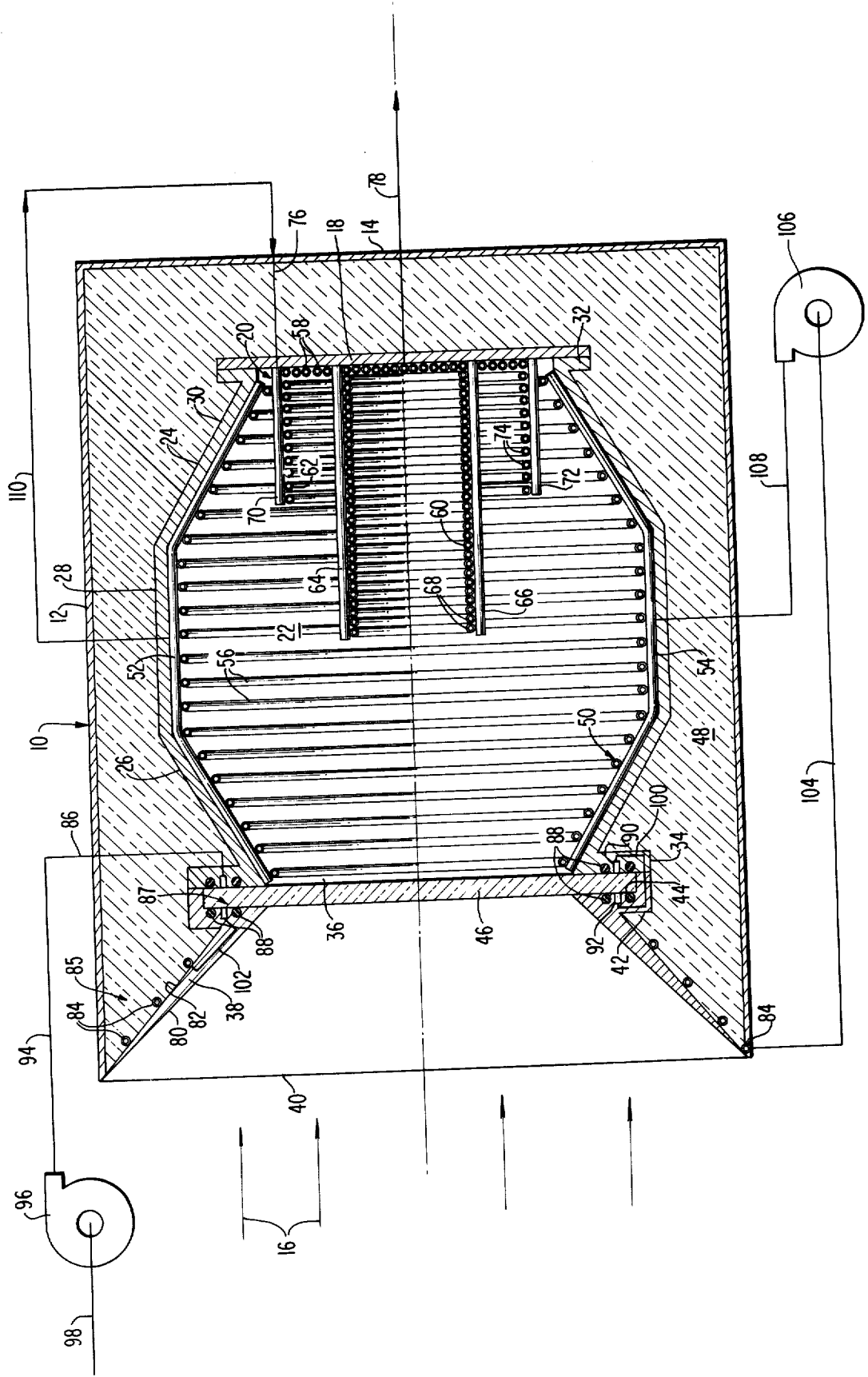

PEAK EFFICIENCY SOLAR ENERGY POWERED BOILER AND SUPERHEATER

BACKGROUND OF THE INVENTION

FIELD OF THE INVENTION

This invention relates to a boiler and superheater for the conversion of solar energy to thermal energy and the creation of steam for powering a steam turbine electric power plant or the like, and more particularly, to an improved boiler and superheater which maximize heat retention and improves the energy conversion efficiency thereof.

REFERENCE TO RELATED APPLICATION

This application relates to U.S. application Ser. No. 399,669 filed Sept. 21, 1973, and entitled "Direct Solar Hydro-Electric Integrated System and Concentrating Heliostat for Same", and assigned to the common assignee.

DESCRIPTION OF THE PRIOR ART

Very few boiler superheater units employed in conjunction with a solar energy conversion system have ever been successfully operated and these are on a small laboratory scale. While attempts have been made to provide high efficiency in the conversion of the light energy of the solar field into thermal energy, and in particular, with respect to the use of that thermal energy in the creation of steam and the superheating of the same, the known boiler and superheaters have been plagued by thermal convection losses as well as by loss of fringe solar radiation due to optical system imperfections, and loss through infra-red radiation as a result arising from the temperature of the conversion surface. While convection problems have been minimized to some extent, by locating the boiler superheater unit above the reflection mirror field with the cavity or conversion chamber at the bottom of the unit and facing vertically the mirror field, and while this trapped, to some extent, the hot air from convection in the chamber, this adversely limits the physical plant and results only in minimizing to some degree convection losses. Additionally, where secondary concentration devices have been employed in the vicinity of the boiler and superheater, these concentration devices have failed due to degradation caused by overheating in the atmosphere. Further, it has been generally supposed that the boiler superheater unit must be specifically designed for the flux field as provided by the particular reflection mirrors which supply the energy in concentrated form to the boiler superheater unit for conversion purposes, and have thus limited entry into this field.

SUMMARY OF THE INVENTION

The present invention is directed to an improved boiler and superheater with improved efficiency in the conversion of solar energy into thermal form, particularly with respect to a solar energy powered steam turbine generator system in the multi-kilowatt size. The improved boiler and superheater of the present invention permits this operation with dynamic or widely variable solar flux patterns, particularly as generated by the concentrating heliostat of the above referred application.

Such boiler and superheaters, include a tubular enclosure having one end closed and defining an energy conversion chamber which is axially aligned with a solar energy radiation field and wherein a superheater heat exchanger extends across the closed end of the chamber and wherein the other end of the chamber is open to the radiation field and forms a solar radiation receiving aperture. A second tubular heat exchanger lies within the enclosure and is positioned between the aperture and the superheater heat exchanger and thermal insulation lies between the heat exchangers and the walls of the enclosure. The heat exchangers are fluid coupled together and with means to supply water to the first heat exchanger and remove superheated steam from the second heat exchanger. The invention is directed to the improvement wherein a light window sealably overlies the aperture of the enclosure and is opaque to infra-red radiant energy and which absorbs some of the infra-red radiation and which is positionable in the focal plane of the concentrated solar radiation, and wherein means cool the window to prevent self destruction thereof. Escape of thermal energy by convection is prevented with the energy conversion efficiency of the boiler and superheater being enhanced.

A frustoconical reflecting surface or concentrator may surround the window and extend axially towards the solar radiation field and is flared radially outward from the window to reflect fringe solar energy into the chamber and through the light window. Preferably, means for cooling the frustoconical reflecting surface and the window itself comprise heat exchangers for preheating the boiler feed water.

The chamber may include a cylindrical portion of an enlarged diameter relative to the aperture which lies intermediate of a frontal frustoconical portion which flares radially outward from the window and a rearward frustoconical portion which flares radially inward to the superheater exchanger interface to maximize the effective surface area of the heat exchangers. A plurality of concentric cylindrical coils may protrude axially from the rear wall of the chamber and form portions of the superheater heat exchanger to increase the heat exchanger surface area of the superheater without compromising the size of the boiler and super-heater and without material shadowing solar energy impingement on the boiler heat exchanger which concentrically surrounds the superheater cylindrical coils. The window may be formed of quartz and the superheater and boiler heat exchangers may be formed of stainless steel tubing.

BRIEF DESCRIPTION OF THE DRAWING

The single FIGURE is a partial schematic, sectional view of the improved peak efficiency solar energy powered boiler superheater of the present invention as applied to a steam turbine energy conversion system.

DESCRIPTION OF THE PREFERRED EMBODIMENT

Referring to the single FIGURE, there is illustrated the peak efficiency solar energy powered boiler and superheater 10 in section and which is incorporated within a steam turbine system driven and powered by highly concentrated solar energy from a solar energy source (not shown) but which directs a solar energy field along a path coinciding with the axis of the boiler and superheater 10. The boiler and superheater is tubular and preferably cylindrical in configuration and is formed of a metal enclosure or outer casing 12 which is cup shaped in configuration including an end wall 14 which closes off that end of the cylindrical casing 12 opposite to the radiant energy field indicated generally by arrows 16. A bulkhead 18 spaced from end wall 14 defines the position of a first or superheater heat exchanger 20 which lies at the rear of an energy conversion chamber or cavity 22 which is further defined by an inner tubular sheet metal member or casing 24. Casing 24 consists of a frontal frustoconical section or portion 26, an intermediate cylindrical portion 28 and a rear frustoconical portion or section 30, the sections being integral and the frustoconical portions 26 and 30 flaring radially outwards and radially inwards relative to the larger diameter cylindrical portion 28. The inner casing 24 is provided with a flange 32 which sealably mates with bulkhead 18 at its rear edge, while it is provided with a radially directed flange 34 at its forward end which defines a chamber solar energy receiving aperture or opening 36 of a diameter considerably smaller than that of the external casing 12. Casing 12 extends axially beyond the inner casing 24 toward the radiation field 16 and there is further provided a frustoconical secondary concentrator 38 whose outer edge 40 is of a diameter approximating that of outer casing 10 and whose inner end is flanged at 42. Flange 42 is further recessed at 44 so as to sealably interface with a heat receiver window 46 formed of quartz, the quartz window 46 being opaque to infra-red radiation generated within conversion chamber 22 but having little resistance to the transmission of light from the solar field 16 to the chamber 22. The flanges 42 and 34 are in edge abutment to sandwich the outer periphery of window 46 therebetween. Thermal insulation 48 fills the space between elements 38, 24, 18, and the outer casing 12. Means for fixing the secondary concentrator 38, the inner casing 24 and the bulkhead 18 are not shown, but such are provided so as to minimize the conduction of heat between the inner and outer casings. The inner walls of chamber 22 are preferably black box, that is, non-radiant and positioned within the chamber 22 and extending axially along the inner walls of casing sections 26, 38 and 30, is a boiler or second heat exchanger 50 which consists essentially of upper and lower tubular headers 52 and 54 forming parallel flow paths through the heat exchanger coils 56 which are fluid coupled to the headers and extend between the same. The coils 56 are circular in configuration, when the chamber configuration is cylindrical. In terms of the first superheater heat exchanger 20, preferably, this heat exchanger takes at least the form of a coiled tube 58 mounted on the inner surface of bulkhead 18 and constituting the rear wall of chamber 22, while further in the illustrated embodiment there is shown inner and outer concentric, cylindrical superheater coils 60 and 62 which project axially from the chamber end wall defined by bulkhead 18 and forwardly towards the window 46. The projecting coil 60 includes upper and lower headers 64 and 66, fluid coupled to and supporting circular tubing 68 in parallel flow paths, while the somewhat larger diameter projecting cylindrical superheater coil 62 is provided with upper and lower headers 70 and 72 which support and fluid couple closed loop heat exchange tubes 74. The end coil 58, and the headers of coils 60 and 62 may be fluid coupled to provide series, parallel or series parallel flow paths as desired. However, as illustrated, the steam inlet connection to the superheater heat exchanger 20 is illustrated as being made to the header 76 while the superheated steam is removed from the superheater heat exchanger at the center thereof by axial connection 78, which is fluid coupled to the inlet side of a steam turbine (not shown).

With respect to the secondary concentrator 38, this member constitutes a formed frustoconical annulus, being provided with a reflective inner surface capable of withstanding moderately high temperatures in the atmosphere without loss of optical properties and may have a rhodium reflecting surface 80 and may be formed of a material such as brass or copper. Extreme error rays from the reflection field 16 which are too low in concentration to warrant increasing the aperture size are reflected by reflecting surface 80 into the cavity aperture 36 and through the window 46, preferably the reflective surface 80 should make an angle with the axis of the boiler superheater 10 of no greater than 45°. Otherwise, the angle is too great to reflect an apprecaible amount of the reflected radiation through window 46 and into the chamber or cavity 22. As reflection on large metallic surfaces with the highest reflectivity materials such as silver and aluminum being less than 0.83, it is necessary to cool the concentrator 38 to avoid overheating and degradation or destruction of that member. In this respect, on the radially outer surface 82 of the concentrator 38, there is provided a heat exchanger 85 comprising a series of loops of tubing 84 through which water for the boiler and superheater is preheated prior to introduction into the heat exchangers 20 and 50 of chamber 22.

In order to hermetically seal the conversion chamber or cavity 22, annular grooves are provided in both flanges 34 and 42 facing the sides of the quartz window 46 and conventional O-ring seals 80 fill these grooves and are compressed against the surfaces of the window. Further, between each pair of the annular grooves and the O-rings 88, there is provided annular grooves 90 and 92 of rectangular configuration in cross section within flanges 34 and 42 respectively, with the low pressure preheating inlet line 86 leading from the preheater pump 96 supplying turbine condensate from a condenser drain line 98 leading from the turbine (not shown), thus causing the boiler feed water to be preheated while cooling window 46 seals 80 prevent leakage of coolant. A drilled passage 100 fluid connects the annular grooves 90 and 92 which form heat exchanger 87, and a further drilled passage 102 fluid connects annular groove 92 within flange 42 to the concentrator heat exchanger 85 tubes 84, thus the boiler feed water is preheated by the heat exchanger associated with the window 46 and the concentrator or reflector 38. This preheated water condensate is then fed from the loop conduit 84 through preheater discharge line 104 to the high pressure boiler feed water pump 106 where it discharges through boiler inlet line 108 into the lower header 54 of the boiler heat exchanger 50. In turn, a boiler steam discharge line 110 is fluid coupled to the upper header 52 and directs the boiler steam to the superheater inlet line 76 which opens up into the upper header 70 of axially protruding superheater coil 62. Series, parallel, or series parallel flow connections are made between the tubing 58 on the rear wall of the chamber 22 and concentric protruding cylindrical coils 60 and 62 with the superheated steam being discharged therefrom to the turbine. Thus, the improved boiler and superheater of the present invention retains a maximum amount of the converted thermal energy with little thermal loss while advantageously insuring that the maximum energy of field 16 actually enters the conversion chamber 22. The employment of the heat exchanger associated with window 46 and the reflector or concentrator 30 provides a pre-heating phase for the boiler feed water which adds approximately 29% of the cycle input energy. Boiler 50 adds approximately 50% of the cycle input energy, and superheater 20 adds approximately 15% of the cycle input energy to the steam passing through the turbine. The location of the superheater heat exchanger at the rear of the heat exchange cavity or chamber and concentric with the boiler and further within the zone of maximum energy concentration intensity creates a natural fit with the solar energy distribution pattern within the cavity, particularly as provided by concentrating heliostat of the referred to application. The zone of high concentration is also on the order of 15% of the total energy. The free radiant energy from the walls of the superheater heat exchanger 20 which operate 250° to 300° F. above the boiling temperature is absorbed by the surrounding boiler surface and constitutes a further efficiency improvement feature of the present invention. Further, the enlargement of chamber 22 in diameter relative to the diameter of the aperture 36 at the focal plane of the concentrated thermal solar radiation field 16 not only increases the heat transfer area of the boiler, but provides versatility to permit the boiler and superheater to operate with varied and dynamic flux patterns from different configurations of mirror field, and enables varied steam production rates in areas of localized energy concentration. Transverse diffusion of extreme concentrations is accomplished by internal metallic conduction and by the varied surface emissivity patterns.

As may be readily apparent from the description above, in operation, the cycle starts with water from the condenser of the turbine (both not shown) being pumped at low pressure by pump 96 through the passages defined by tubing 84 and annular grooves 90 and 92 to cool the chamber window 46 and the secondary concentrator 38. Upon leaving the preheating components, the water is raised to the cycle pressure by high pressure pump 106 and pumped into the boiler heat exchanger 50. Steam and water separation occurs at the upper header 52 of the boiler heat exchanger 50 and the steam exits the boiler heat exchanger and enters the superheater heat exchanger 20. Superheater heating takes place in the passages along the rear wall as defined by tubing 58 and along the superheater heat exchanger cylindrical protrusion coils 60 and 62 and is discharged for use by the turbine at the center of the chamber rear wall. While the low pressure tubing 84 may comprise copper, upon pressurization by pump 106, of necessity the boiler heat exchanger tubing and the superheater heat exchanger tubing must be formed of stainless steel or the like capable of withstanding the high temperature pressure combination necessary to the turbine operation desired, particularly with respect for large size power plant operation.

While the invention has been particularly shown and described with reference to a preferred embodiment thereof, it will be understood by those skilled in the art that various changes in form and details may be made therein without departing from the spirit and scope of the invention.

What is claimed is:

1. In a solar energy powered steam boiler and superheater for converting concentrated solar radiation to thermal energy form, said boiler and superheater including: a tubular enclosure having one end closed defining an energy conversion chamber and being axially aligned with a solar energy radiation field, a first, superheater heat exchanger extending across the closed end of said enclosure chamber, said other end of said chamber being open to said radiation field and forming a solar radiation receiving aperture, a second, tubular, boiler heat exchanger within said enclosure and positioned between said aperture and said superheater heat exchanger, thermal insulation between said heat exchangers and the walls of said enclosure, means fluid coupling said heat exchangers to permit fluid flow from said second heat exchanger to said first heat exchanger and means for supplying water to said second heat exchanger and removing superheated steam from said first heat exchanger, the improvement comprising:

a light window in the form of a circular plate sealably overlying said aperture of said enclosure chamber and being opaque to infra-red radiant energy and which absorbs some of said infra-red radiation and being positionable in the focal plane of the concentrated solar radiation, a frustoconical reflecting surface surrounding said window, extending axially toward the solar radiation field and being flared radially outward of said window to reflect fringe solar energy into said chamber through said light window, annular duct means position at the circular plate periphery for cooling said plate window to prevent self destruction thereof, said duct means comprising a third heat exchanger fluid coupled to said second heat exchanger and upstream thereof to preheat the boiler feed water and a fourth heat exchanger fluid coupled to said second heat exchanger and upstream thereof and mounted to said frusto conical reflecting surface to prevent its self destruction and to further preheat the boiler feed water.

2. The boiler and superheater as claimed in claim 1, wherein said frustoconical reflecting surface has an angle no greater than 45° to the axis of said enclosure.

3. The boiler and superheater as claimed in claim 1, wherein said chamber includes at least a frustoconical portion extending inwardly from said window toward said superheater heat exchanger and said second boiler heat exchanger extends along said frustoconical chamber surface to effect enlargement of the effective surface area of at least said second heat exchanger.

4. The boiler and superheater as claimed in claim 1, wherein said chamber includes a cylindrical portion intermediate of a frontal frustoconical portion which flares radially outwardly from said window and a rearward frustoconical portion which flares radially inwardly to the superheater heat exchanger interface to maximize the effective surface area of the heat exchangers.

5. The boiler and superheater as claimed in claim 4, wherein said first superheater heat exchanger includes at least one cylindrical coil portion which protrudes axially from the rear wall of said chamber towards said window to increase the heat exchange surface area of the superheater heat exchanger and being of a diameter somewhat less than the diameter of the second heat exchanger and being concentrically positioned relative to said second heat exchanger to effectively increase the heat exchange surface of the superheater heat exchanger due to the low film coefficient of heat transfer in the superheater heat exchanger to the gaseous steam carried thereby.

6. The boiler and superheater as claimed in claim 1, wherein said first superheater heat exchanger includes at least one cylindrical coil portion which protrudes axially from the rear wall of said chamber towards said window to increase the heat exchange surface area of the superheater heat exchanger and being of a diameter less than the diameter of the second heat exchanger and being concentrically positioned relative to said second heat exchanger to effectively increase the heat exchange surface of the superheater heat exchanger due to the low film coefficient of heat transfer in the superheater heat exchanger to the gaseous steam carried thereby.

7. The boiler and superheater as claimed in claim 1, wherein said window is formed of quartz.

* * * * *